United States Patent Office 3,260,368
Patented July 12, 1966

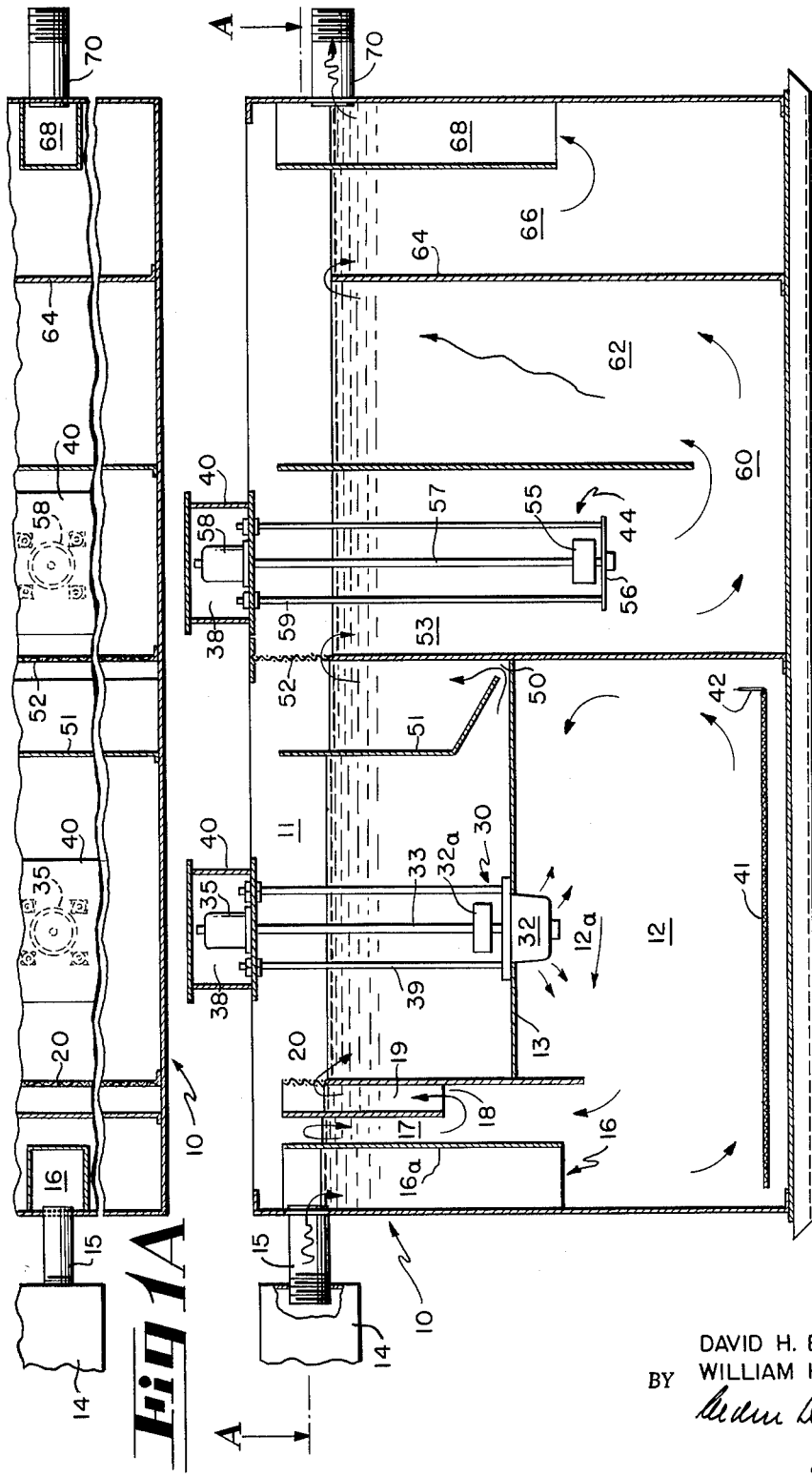

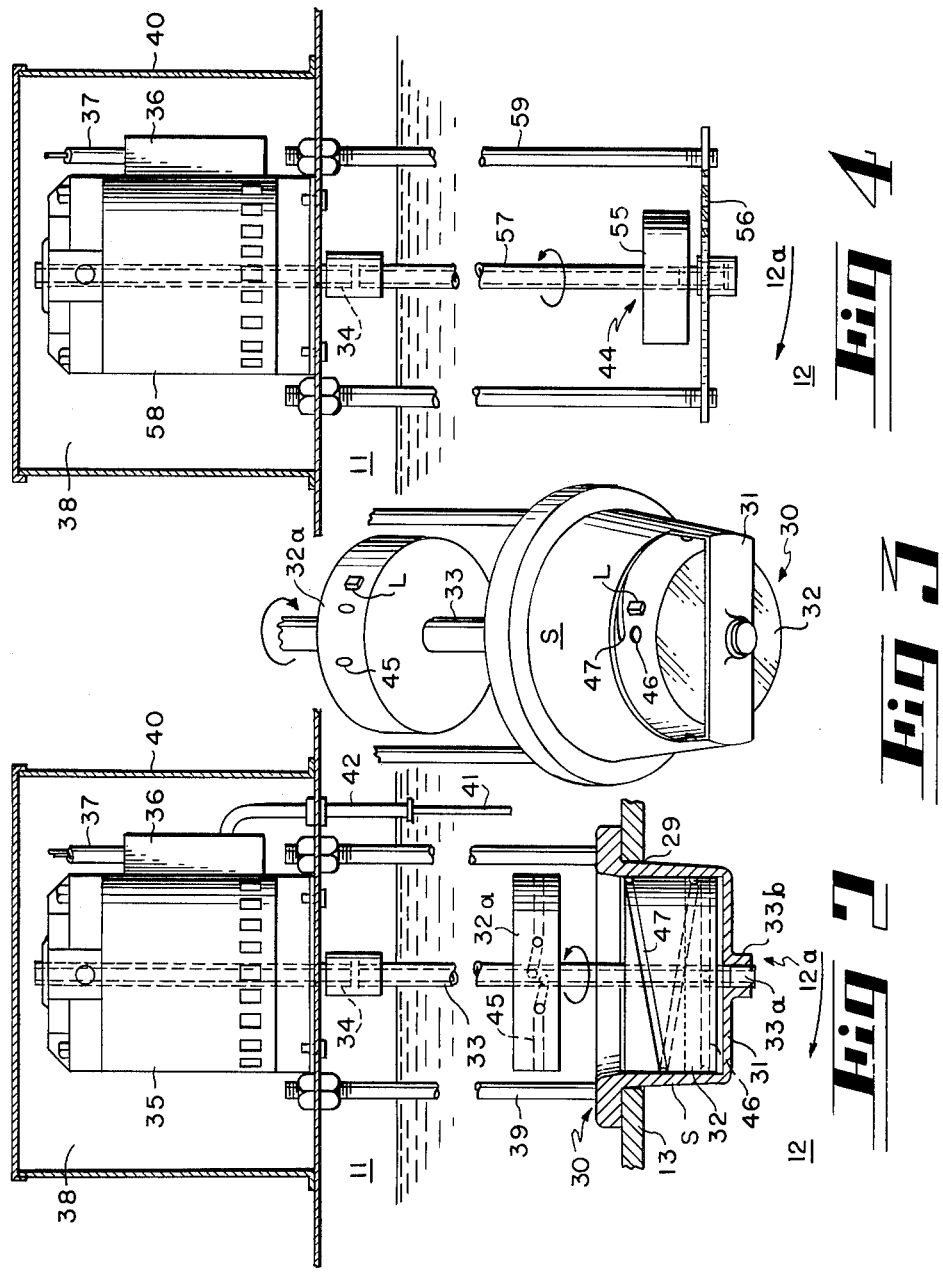

3,260,368
SEWAGE DISPOSAL SYSTEM
William H. Wagner, Montoursville, and David H. Eberly, Jr., York, Pa., assignors to Avco Corporation, Williamsport, Pa., a corporation of Delaware
Filed Dec. 23, 1963, Ser. No. 332,523
7 Claims. (Cl. 210—195)

This invention relates to the biochemical treatment of sewage and is concerned with the provision of a practical sewage treatment apparatus which is simple in construction, effective in operation, and relatively low in cost.

In many communities it is not economically possible to make provision for the erection and operation of a central high-capacity sewage disposal plant and the nature of the terrain, soil condition, density of housing, and related factors are such that septic tanks do not effectively clarify the sewage effluent to a point where the Biological Oxygen Demand complies with that required by law.

Biological Oxygen Demand is a measure of the effectiveness of sewage treatment, expressed as the percentage of the oxygen demand of raw sewage that has been satisfied. This is customarily referred to as BOD.

The result of the economic factors noted above is that residents of certain communities are on the horns of a dilemma: They must choose between an expensive community sewage disposal plant which the community cannot support, or continue to violate the legal health requirements established by the state or municipality in which they live.

The present invention provides a sewage disposal system and apparatus which is more effective than a septic tank arrangement of equivalent capacity, more effective qualitatively than many high-capacity community plants, insures compliance with the requirements of health authorities, and avoids the necessity, where limited sewage disposal facilities are required, of bond issues and high taxes for the construction of sewage networks and commercial sewage disposal facilities.

The average BOD of a septic tank is about 40% and the amount of suspended solids is high. With the apparatus of the present invention a BOD of 90% and even higher is obtained, and suspended solids are reduced 85% to a figure of the order of 3.5 parts per million of dissolved oxygen in the treated effluent. This prevents premature failure of tile fields, seepage beds and pits, and obviates the need for sand filters. It also permits the use of smaller tile fields, seepage beds and pits than would be required in septic tank installations. In addition, where chlorination is required by law, the extent thereof is reduced by the present invention. The effectiveness of the apparatus, and the process carried out thereby, will of course vary, depending upon such factors as organic load, water usage and temperature.

Objects of the present invention include the accomplishment of the results described above.

A further object of the invention is to provide sewage disposal apparatus which can be factory made and supplied to the consumer in a package at minimum cost and installed without the need of special technical skills.

Another object is to provide a sewage disposal apparatus which can be utilized, at relatively low cost, for individual homes or small groups of inhabited buildings not served by public sewage systems.

A further object is to provide an apparatus which simply and effectively brings sewage up to the required legal standards prior to its being discharged into waterways.

A still further object is the provision of an apparatus which is effective in areas where soil conditions, population density or other factors are such that septic tanks are not effective.

A still further object is to provide an apparatus which will effectively treat sewage with the minimum amount of externally supplied energy, maximize solids separation and decomposition, minimize sludge build-up, control foaming and minimize the production of objectionable odors.

A still further object is the provision of a sewage disposal system utilizing a continuous flow principle, which operates effectively on partial loads as well as the maximum load which it is designed to accommodate.

The novel features that are regarded as characteristic of the invention are set forth in the appended claims; the invention, itself, however, together with additional objects and advantages thereof, will best be understood from the following description of specific embodiments when read in conjunction with the accompanying drawings, in which:

FIG. 1 is a longitudinal sectional view of an illustrative apparatus;

FIG. 1A is a fragmentary section on line A—A of FIG. 1;

FIG. 2 is an enlarged section of the aspirator circulator shown in FIG. 1;

FIG. 3 is a perspective of the aspirator circulator operating elements; and

FIG. 4 is a sectional view of an illustrative aspirator used during a terminal part of the processing.

Briefly described, the invention comprises a tank, having a lower chamber and an upper chamber, means for directing sewage influent into and around said lower chamber and mixing the same for anaerobic digestion therein, means for directing anaerobically digesting sewage upwardly into the top of the upper chamber for aerobic digestion therein, means between the two chambers for discharging small amounts of liquid from the upper chamber to the lower chamber for facultative digestion of sewage in the immediate region of said discharge.

The invention also includes the construction and arrangement of this last-mentioned means for discharging oxygen in the form of minute bubbles of air into the upper chamber to promote aerobic digestion therein, and discharging a lesser amount of oxygen in the form of minute bubbles of air into the lower chamber.

An important feature of the invention is that the fluid flow and mixing of the treated material through the system is relatively slow and the flow may be described as laminar, unaccelerated and non-turbulent.

In FIG. 1 the illustrative apparatus comprises a tank 10 divided into upper aerobic chamber 11, and a lower anaerobic chamber 12 formed by a horizontal partition 13. The sewage influent, having optionally passed through a filter 14 of the type described and claimed in an application of David H. Eberly, Jr., Serial No. 226,372 filed September 26, 1962, flows into tank 10 through conduit 15 where it is deflected downwardly by the walls 16a of flue 16. The flow through anaerobic chamber 12 is a natural unaccelerated flow which is induced by the supply at the top of the chamber, by the construction and baffling shown, and by the slight head built up in chamber 16. It generally follows the direction of the arrows noted in FIG. 1 and during the passage of the sewage through chamber 12 the solid particles are fairly well digested by anaerobic bacteria, leaving a minimum of sludge on the bottom of the chamber. The sewage rises into section 17 and then drops downwardly before entering into the slots 18 of compartment 19, which are of relatively small cross-sectional area and tend to limit the flow through the system.

The partially digested sewage—with almost complete solids separation—rises in compartment 19 and overflows through weir 20 into aerobic chamber 11 where aerobic digestion takes place, facilitated by aspirator-circulator means hereinafter more particularly described, which discharges oxygen, conveniently from the ambient air, into the digesting liquid, in extremely finely divided particles or bubbles but in restricted volume. Substantially complete solids separation is accomplished prior to the arrival of the sawage in chamber 11 as shown by the substantial absence of suspended solids and flotsam in that chamber.

The aspirator-circulator means is generally designated as 30 and is shown in detail in FIGS. 2 and 3. It comprises cylinders 32 and 32a secured to hollow shaft 33 which is journaled at 33a in a bearing 33b. Cylinder 32 is rotatable in a sleeve S secured in an opening 29 in partition 13. A U-shaped strap or support 31 extends across the bottom of the sleeve and carries the bearing 33b. It will be seen that cylinders 32 and 32a operate substantially in the separate compartments 11 and 12, and are connected through shaft 33 with the atmosphere 38 within covering 40. This covering is not airtight but is provided to protect the actuating motor 35 from the weather. The motor 35 is connected to a source of electric power (not shown) through junction box 36 and cable 37. Shaft 33 extends upwardly from cylinders 32 and 32a for connection by a suitable joint or collar with the shaft 34 of electric motor 35. Supporting rods 39 aid in providing a firm base for support 31. A heating element 41 extending into the digesting liquid in the lower compartment may desirably be connected through conduit 42 in parallel circuit with the motor through junction box 36 for the purpose of raising the temperature of the liquid and accelerating anaerobic digestion. The preferred process requires heating in chamber 12 only after a substantial accumulation of solids therein. In practice we have found that this need be done only after several years of use. Typically heater 41 may be supplied with 300–400 watts of power and this heating—when needed—continued for 10 to 15 days. Although temperatures of the order of 80 to 100° F. should be maintained, we have found that a temperature of 90° F. is optimum.

The construction of the aspirator-circulator cylinders 32 and 32a, formed of corrosion resistant material such as aluminum alloy, can best be understood by reference to FIGS. 2 and 3. Each is provided with one or more passages 45, 46 extending radially outwardly and connecting the interior of hollow shaft 33 with the exterior surface of the cylinders, which are effectively open to the body of sewage in the respective chambers. The passages 45, 46 are of relatively small diameter, say 3/16", and therefore yield a relatively small cross section which limits the quantity of air forced therethrough by a differential in pressure which may be induced by lugs L secured to the outer leading edge of passages 45, 46. This air appears in the form of a cloud of fine bubbles rising to the top of chamber 11 of a size of the order of 1/40" in diameter, or smaller. These bubbles persist in the solution for a considerable time, many of them not breaking when they reach the surface of the liquid. This enhances the aerating effect without substantially disturbing the work of the aerobic colonies by violent agitation.

In other words, this limited flow of oxygenating air, manifested in the formation of these minute bubles, efficiently performs the function of enhancing aerobic digestion. We have found that an air bubble 1/40" in diameter traveling through aqueous liquid has ten times the oxygenating ability of a bubble 1/10" in diameter.

Also provided on cylinder 32 is means for effecting a very limited flow of liquid from the upper compartment 11 to the lower compartment 12, consisting desirably of a helical groove 47 of small cross section, for instance, a semi-circular groove 1/4" in diameter. In operation, as the cylinder 32 rotates, small amounts of aerobic-digested liquid are forced downwardly from chamber 11 into anaerobic chamber 12, thus enabling facultative digestion of bacteria to take place in the region 12a immediately surrounding the cylinder 32 and strap 31 in the lower chamber, and extending toward and into section 17.

It will be perceived that the aspirator-circulator thus described performs three functions. The first is to draw in atmospheric air through rotating tube 33 and discharge the same through radial passages 45 into the aerobic chamber 11 of the tank 10. It is desirable to provide a greater number of passages 45 in cylinder 32a than passages 46 in cylinder 32 so that a greater amount of air is discharged from cylinder 32a, but in either event the rate of air flow is low and the aggregate volume small, in sharp contrast with prior art methods of forcing large amounts of air into the sewage and creating violent turbulence.

The second function is to discharge a limited amount of air into the anaerobic chamber 12, notwithstanding the fact that anaerobic bacteria do not thrive in the presence of oxygen, as will be hereinafter more fully explained. Accordingly, only a small number of passages 46 are provided so that only 5 to 15% of the total air is forced into the lower chamber. The total air flow into the unit is of the order of 2 cubic feet per minute, the major part of which is released into the upper chamber in the form of finely divided extremely minute bubbles of air, moving outwardly by reason of the slight pressure differential caused by the lugs L disposed in front of the spinning outer faces of passages 45, 46.

The third function is that spiral groove 47 acts as a pump to move liquid from the upper aerobic chamber 11 to the lower anaerobic chamber 12, in amounts very small in proportion to the total volume of liquid in tank 10. This creates a region 12a in the anaerobic zone 12 in which facultative bacteria thrives, where there is a very low $O_2$ content, and where the accumulation of methane in the upper portion of the lower chamber is minimized. If too great a concentration of methane forms in this chamber, the anaerobic bacteria are destroyed.

After the liquid sewage material has been digested in the upper aerobic chamber 11 of the system, it is discharged through a restricted passage 50, formed by baffle 51 that extends entirely across the upper portion of the tank between the sides thereof, and flows over a wier 52 into a re-aeration compartment 53, into which more oxygen is introduced through an aspirator-circulator 44, of a construction similar to aspirator 32, which is supported partially upon a perforated plate 56 and by rods 59. Shaft 57, motor 58, and related parts may be similar in construction to those described in connection with the left hand side of FIG. 1.

After slow passage through the re-aeration chamber 53, the by-now substantially completely treated sewage material, which is now all liquid, passes through passage 60 into detaining tank 62, in which the sewage undergoes a somewhat static treatment during which some of the oxygen remaining therein still encourages the aerobic bacteria to operate. The liquid then passes over wier 64 into discharge compartment 66 for exit through restricted flue 68 and exhaust pipe 70 for conducting the substantially pure effluent to a stream, drainage ditch, or the like.

The motors 35 and 58 are desirably fractional horse power motors arranged to rotate at low speeds of the order of 1725 r.p.m. Thus, with air inlet tubes 33, 57 having passages of 1/2" in diameter, an air flow of the order of 2 cubic feet per minute is obtained. It has been found that low velocity air flows of the order of 1 to 4 cubic feet per minute are desirable to create the slow flow of finely divided bubbles of air in the region of cylinders 32, 32a and 55. With a very limited number of passages 46, a still more limited bubbling of air in region 12a is obtained. The liquid flow through spiral groove 47 should be at a limited rate. The groove 47 of an illustrative apparatus was designed to produce, with a speed of rotation of 1725 r.p.m. for shaft 33, an aggregate flow of 150 gallons per hour, but since a large amount of air is included in the fluid pumped from chamber 11 to chamber 12, the actual liquid flow is probably only 75 or 50 gallons per hour. It will be observed, therefore, that with a 2000 gallon tank the rate of internal recirculation of fluid is of the order of 1% per hour.

Our reference to facultative digestion refers to the biochemical action of colonies of bacteria which can hardly be described as either aerobic or anarobic but which thrive in a largely anaerobic environment containing small quantities of oxygen, as noted by Dirasian, Molof and Borchardt in a paper given at the 35th Annual Meeting of the Water Pollution Control Federation in Toronto, Ontario, October 7-11, 1962. Such an environment is provided in the region immediately below the aspirator-circulator rotor 32, and designated generally in FIG. 1 at 12a. Due to the flow of liquid past this rotor and into the regions 17 and 19, the slight oxygenation of the fluid is extended from region 12a to regions 17 and 19, although the concentration of oxygen diminishes as the fluid approaches wier 20 and is discharged into upper chamber 11.

Having thus described our invention, we claim:

1. In a sewage disposal system for the continuous bacteriological treatment of raw sewage and having an inlet and outlet, the combination of: (1) a tank comprising a lower chamber and an upper chamber separated from one another by a baffle having an opening therein, (2) means for inducing the flow of sewage influent into and around said lower chamber for anaerobic digestion therein, (3) means for directing anaerobically digested sewage upwardly from said lower chamber into the top of the upper chamber for aerobic digestion therein, (4) means between the two chambers associated with said baffle for (a) discharging oxygen in the form of minute bubbles of air into the upper chamber to promote aerobic digestion therein, (b) discharging a lesser amount of oxygen in the form of minute bubbles of air into the lower chamber, and (c) discharging small amounts of liquid from the upper chamber to the lower chamber downwardly through said opening for facultative digestion of sewage in the immediate region of the point of discharge of air in said lower chamber.

2. In a sewage disposal system for the continuous bacteriological treatment of raw sewage and having an inlet and outlet, the combination of: (1) a tank comprising a lower chamber and an upper chamber separated from one another by a partition with an opening therein, (2) means for inducing the flow of sewage influent into and around said lower chamber for anaerobic digestion therein, said means comprising an upper inlet and a baffle diverting said influent downwardly into said lower chamber, (3) means for directing anaerobically digested sewage upwardly from said lower chamber into the top of the upper chamber for aerobic digestion therein, (4) means between the two chambers associated with said partition for (a) discharging oxygen in the form of minute bubbles of air into the upper chamber to promote aerobic digestion therein, (b) discharging a lesser amount of oxygen in the form of minute bubbles of air into the lower chamber, and (c) discharging small amounts of liquid from the upper chamber to the lower chamber downwardly through said opening for facultative digestion of sewage in the immediate region of the point of discharge of air in said lower chamber.

3. In a sewage disposal system for the continuous bacteriological treatment of raw sewage and having an inlet and outlet, the combination of: (1) a tank comprising a lower chamber and an upper chamber separated from one another by a partition with an opening therein, (2) means for directing sewage influent into and around said lower chamber and mixing the same for anaerobic digestion therein, said means comprising an upper inlet and a baffle diverting said influent downwardly into said lower chamber, (3) means for directing anaerobically digested sewage upwardly from said lower chamber into the top of the upper chamber for aerobic digestion therein, (4) a source of air outside the upper chamber, and (5) rotating means associated with said partition including fluid flow-inducing means and fluid discharge passages disposed between each of said chambers and connected to said source for (a) discharging minute air bubbles into said upper chamber to promote aerobic digestion therein, (b) discharging a lesser quantity of such air bubbles into the lower chamber, and (c) discharging liquid from the upper chamber to the lower chamber downwardly through said opening for facultative digestion of sewage in the immediate region of the point of discharge of air in said lower chamber.

4. In a sewage disposal system for the continuous bacteriological treatment of raw sewage and having an inlet and outlet, the combination of: (1) a tank comprising a lower chamber and an upper chamber separated from one another by a baffle having an opening therein, (2) means for inducing sewage influent to flow into and around said lower chamber for anaerobic digestion therein, (3) means for directing anaerobical digesting sewage upwardly from said lower chamber into the top of the upper chamber for aerobic digestion therein, (4) means in each of the two chambers associated with said baffle for discharging oxygen in each chamber in the form of minute bubbles of air, said discharging means including means for slowly recirculating small amounts of fluid from the upper chamber to the lower chamber downwardly through said opening for inducing facultative digestion in the lower chamber in the immediate vicinity of said fluid recirculating means.

5. In a sewage disposal system for the continuous bacteriological treatment of raw sewage and having an inlet and outlet, the combination of: (1) a tank comprising a lower chamber and an upper chamber separated from one another by a partition with an opening therein, (2) means for directing sewage influent into and around said lower chamber and mixing the same for anaerobic digestion therein, said means comprising an upper inlet and a baffle diverting said influent downwardly into said lower chamber, (3) means for directing anaerobically digested sewage upwardly from said lower chamber into the top of the upper chamber for aerobic digestion therein, (4) a source of air outside the upper chamber, and (5) means associated with said partition including fluid flow-inducing means and fluid discharge passages disposed in each of said chambers and connected to said source for discharging minute air bubbles into said upper chamber to promote aerobic digestion therein, and simultaneously discharging air bubbles into the lower chamber to promote facultative digestion of sewage in the immediate region of the point of discharge of air in said lower chamber, and simultaneously discharging small amounts of liquid from the upper chamber to the lower chamber downwardly through said opening.

6. In a sewage treatment tank having an inlet and outlet, an upper compartment and a lower compartment separated from one another by a baffle having an opening therein, a sleeve associated with said baffle and mounted between the compartments, an aspirator-circulator device mounted for rotation on said sleeve, said device comprising, a rotor having an aperture centrally thereof, passages extending radially thereof between said aperture and the surface of said rotor, a spiral groove on said surface, means to supply air to said rotor aperture, means to revolve said rotor whereby said passages draw air from said aperture and deliver the same exteriorly of said rotor into said lower compartment, and said groove simultaneously draws liquid downwardly through said opening from the upper compartment into the lower compartment, and means to discharge air into said upper compartment.

7. In a sewage disposal system having an inlet and outlet, an upper chamber for aerobic digestion and a lower chamber for anaerobic digestion in combination, a baffle separating said chambers, an opening in said baffle, a sleeve disposed in said opening, a cylinder rotatably mounted in said sleeve, said cylinder having an axial aperture centrally thereof and radial passages extending between said aperture and the exterior surface of said cylinder, a spiral groove on said exterior surface, means to supply air to said cylinder aperture whereby, upon rotation of said cylinder, air is drawn through said radial passages and discharged into said lower chamber and liquid is simultaneously moved through said groove downwardly through said opening from said upper chamber to said lower chamber, and means to discharge air into said upper chamber.

References Cited by the Examiner

UNITED STATES PATENTS

| | | | |
|---|---|---|---|
| 507,774 | 10/1893 | Ball | 210—220 X |
| 1,017,590 | 2/1912 | Rice et al. | 261—87 |
| 1,314,955 | 9/1919 | Flicker | 210—15 X |
| 1,902,078 | 3/1933 | Jenks | 210—195 |
| 2,436,375 | 2/1948 | Booth et al. | 210—521 X |
| 2,578,040 | 12/1951 | Booth et al. | 210—221 X |
| 2,588,233 | 3/1952 | Hapman | 210—320 |
| 3,053,390 | 9/1962 | Wood | 210—219 X |
| 3,161,590 | 12/1964 | Weis et al. | 210—521 X |

FOREIGN PATENTS

| | | |
|---|---|---|
| 105,654 | 4/1917 | Great Britain. |
| 745,457 | 2/1956 | Great Britain. |

REUBEN FRIEDMAN, *Primary Examiner.*

J. DeCESARE, *Assistant Examiner.*